(12) United States Patent
Youm et al.

(10) Patent No.: US 10,676,609 B2
(45) Date of Patent: Jun. 9, 2020

(54) THERMOPLASTIC ELASTOMER COMPOSITION AND MOLDED ARTICLE MANUFACTURED FROM THE SAME

(71) Applicant: Lotte Advanced Materials Co., Ltd., Yeosu-si (KR)

(72) Inventors: Kyoung Tae Youm, Uiwang-si (KR); Nam Hyun Kim, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 71 days.

(21) Appl. No.: 15/855,070

(22) Filed: Dec. 27, 2017

(65) Prior Publication Data

US 2018/0186997 A1    Jul. 5, 2018

(30) Foreign Application Priority Data

Dec. 29, 2016  (KR) .................. 10-2016-0182195

(51) Int. Cl.
*C08L 53/00* (2006.01)
*C08L 53/02* (2006.01)

(52) U.S. Cl.
CPC ............ *C08L 53/00* (2013.01); *C08L 53/025* (2013.01)

(58) Field of Classification Search
CPC ................................ C08L 53/00; C08L 53/025
See application file for complete search history.

(56) References Cited

U.S. PATENT DOCUMENTS

| 9,534,113 B2 | 1/2017 | Youn et al. |
| 9,758,657 B2 | 9/2017 | Rohrmann et al. |
| 2004/0151933 A1 | 8/2004 | Ajbani et al. |
| 2013/0289158 A1* | 10/2013 | Youn ............... C08L 23/02 523/122 |

FOREIGN PATENT DOCUMENTS

| CN | 102875879 A | 1/2013 |
| CN | 102936368 A | 2/2013 |
| CN | 105051100 A | 11/2015 |
| CN | 105255092 A | 1/2016 |
| KR | 10-1996-0005073 B1 | 4/1996 |
| KR | 10-0780229 B1 | 11/2007 |
| KR | 10-2012-0078558 A1 | 7/2012 |

OTHER PUBLICATIONS

Author Unknown, Miner Elastomer Products Corporation Technical Data Sheet "Shore A to Shore D Comparison", from www.minerelastomer.com, Aug. 2010 being cited as evidence.*
Office Action in counterpart Korean Application No. 10-2016-0182195 dated Feb. 12, 2019, pp. 1-4.
Office Action in counterpart Chinese Application No. 201711465607.7 dated Oct. 8, 2019, pp. 1-8.

* cited by examiner

*Primary Examiner* — Patrick D Niland
(74) *Attorney, Agent, or Firm* — Additon, Higgins & Pendleton, P.A.

(57) ABSTRACT

A thermoplastic elastomer composition and a molded article manufactured using the same. The thermoplastic elastomer composition includes: a styrene block copolymer, an oil, a polyolefin resin, a polystyrene resin, and inorganic fillers, wherein the thermoplastic elastomer composition has a post-molding shrinkage rate of about 0.08% or less, as calculated by Equation 1 defined in the specification.

16 Claims, No Drawings

THERMOPLASTIC ELASTOMER COMPOSITION AND MOLDED ARTICLE MANUFACTURED FROM THE SAME

CROSS-REFERENCE TO RELATED APPLICATION

This application claims priority under 35 USC Section 119 to and the benefit of Korean Patent Application No. 10-2016-0182195, filed on Dec. 29, 2016 in the Korean Intellectual Property Office, the entire disclosure of which is incorporated herein by reference.

FIELD

The present invention relates to a thermoplastic elastomer composition and a molded article formed of the same.

BACKGROUND

An example of a polyolefin-based thermoplastic elastomer composition is composed of: elastic components including a styrene block copolymer and a paraffin, naphthene, or aromatic oil; a polyolefin resin; inorganic fillers; and a resin stabilizer. Generally, such a polyolefin-based thermoplastic elastomer composition has a low hardness (shore A hardness) of about 20 to 80. A high-hardness polyolefin-based thermoplastic elastomer composition is mainly produced using a dynamically-vulcanized EPDM polyolefin resin. However, such a high-hardness polyolefin-based thermoplastic elastomer composition has problems such as difficulty in setting process conditions required for desired level of hardness, poor reproducibility of desired hardness, and difficulty in varying the composition of a blend.

Korean Patent Application No. 2007-0089916 discloses a thermoplastic elastomer composition including a thermoplastic resin, a block copolymer, and an oil. However, the composition has a shore A hardness of 20 to 80 and is unsuitable for a gasket, and post-molding shrinkage of the composition is not disclosed in this patent.

U.S. Patent Publication No. 2004-0151933 discloses a thermoplastic elastomer composition including a thermoplastic resin, a rubber elastomer, a saturated elastomer, and an oil. However, the thermoplastic elastomer composition has a low shore A hardness of about 50 and has limited applicability.

SUMMARY OF THE INVENTION

Embodiments provide a thermoplastic elastomer composition which can exhibit low post-molding shrinkage and thus can be formed into a molded article having good molding stability.

Embodiments also provide a thermoplastic elastomer composition which can exhibit low post-molding shrinkage and thus can be formed into a molded article having low dimensional change.

Embodiments also provide a thermoplastic elastomer composition which can exhibit high shore D hardness and thus can be formed into a molded article having high hardness.

Embodiments also provide a thermoplastic elastomer composition which can absorb shock caused by external force and/or generated during assembly, thereby preventing damage to internal components and considerably reducing formation of flashes caused by friction at a joint during assembly.

In accordance with exemplary embodiments of the present invention, a thermoplastic elastomer composition includes: a styrene block copolymer, an oil, a polyolefin resin, a polystyrene resin, and inorganic fillers, wherein the thermoplastic elastomer composition has a post-molding shrinkage rate of about 0.08% or less, as calculated by Equation 1:

$$\text{Post-molding shrinkage rate (\%)} = (|MD2-MD1|/MD1) \times 100 \quad (1)$$

(where MD1 is an MD length (unit: mm) of a specimen obtained by injection molding the thermoplastic elastomer composition into a mold having a size of 152.4 mm×152.4 mm×2.1 mm (MD×TD×thickness), as measured after allowing the specimen to stand at 25° C. for 2 hours, and MD2 is an MD length (unit: mm) of the specimen, as measured after allowing the specimen to stand at 25° C. for 72 hours).

The styrene block copolymer may include a non-hydrogenated styrene repeat unit.

An amount (weight) ratio of the polystyrene resin to the polyolefin resin (polystyrene resin/polyolefin resin) may range from about 0.001 to about 0.3.

The styrene block copolymer may be composed of about 10 wt % to about 40 wt % of a hard segment and about 60 wt % to about 90 wt % of a soft segment.

The styrene block copolymer may include a copolymer of [styrene block-ethylene/butylene block-styrene block].

The oil may include a paraffin oil composed of about 20 wt % to about 40 wt % of naphthene and about 60 wt % to about 80 wt % of paraffin.

The polyolefin resin may include a block copolymer of polypropylene and polyethylene.

The inorganic fillers may have a number average particle diameter of about 30 μm or less.

The inorganic fillers may be calcium carbonate.

The thermoplastic elastomer composition may include: about 10 parts by weight to about 40 parts by weight of the styrene block copolymer; about 10 parts by weight to about 50 parts by weight of the oil; about 30 parts by weight to about 70 parts by weight of the polyolefin resin; about 1 part by weight to about 20 parts by weight of the polystyrene resin; and about 1 part by weight to about 20 parts by weight of the inorganic fillers relative to about 100 parts by weight of the thermoplastic elastomer composition (about 100 parts by weight of the styrene block copolymer+the oil+the polyolefin resin+the polystyrene resin+the inorganic fillers).

The thermoplastic elastomer composition may further include a heat stabilizer.

In accordance with another embodiment of the present invention, a molded article is formed of the thermoplastic elastomer composition according to the present invention.

The molded article may have a shore D hardness of about 30 to about 50.

The present invention provides a thermoplastic elastomer composition which can exhibit low post-molding shrinkage and thus can be formed into a molded article having good molding stability.

In addition, the present invention provides a thermoplastic elastomer composition which can exhibit low post-molding shrinkage and thus can be formed into a molded article having low dimensional change.

Further, the present invention provides a thermoplastic elastomer composition which can exhibit high shore D hardness and thus can be formed into a molded article having high hardness.

Furthermore, the present invention provides a thermoplastic elastomer composition which can absorb shocks caused by external force and/or generated during assembly, thereby preventing damage to internal components while considerably reducing formation of flashes caused by friction at a joint during assembly.

DETAILED DESCRIPTION

Hereinafter, embodiments of the present invention will be described in detail. It should be understood that the following embodiments are provided for complete disclosure and thorough understanding of the invention by those skilled in the art. In addition, it should be understood that the present invention is not limited to these embodiments, and that various modifications, changes, and alterations can be made without departing from the spirit and scope of the invention.

As used herein, the term "post-molding shrinkage rate" refers to a value calculated by Equation 1:

$$\text{Post-molding shrinkage rate (\%)} = (|MD2-MD1|/MD1) \times 100 \quad (1)$$

wherein MD1 is an MD length (unit: mm) of a specimen obtained by injection molding a thermoplastic elastomer composition into a mold having a size of 152.4 mm×152.4 mm×2.1 mm (MD×TD×thickness), as measured after allowing the specimen to stand at 25° C. for 2 hours, and MD2 is an MD length (unit: mm) of the specimen, as measured after allowing the specimen to stand at 25° C. for 72 hours.

Here, "MD" refers to an injection molding direction of the specimen, and "TD" is a direction perpendicular to "MD".

As used herein, "shore D hardness" refers to a value measured in accordance with KS M 6518 and ASTM D2240.

Thermoplastic Elastomer Composition

One embodiment of the present invention relates to a thermoplastic elastomer composition.

According to the present invention, the thermoplastic elastomer composition includes a styrene block copolymer, an oil, a polyolefin resin, a polystyrene resin, and inorganic fillers. The thermoplastic elastomer composition can exhibit low post-molding shrinkage through adjustment of an amount ratio of the polystyrene resin to the polyolefin resin and thus can be formed into a molded article having low dimensional change and good molding stability. Particularly, in view of reduction in post-molding shrinkage of the thermoplastic elastomer composition, the styrene block copolymer, the polyolefin resin, and the polystyrene resin are included in the composition and the amount ratio of the polystyrene resin to the polyolefin resin is adjusted.

Now, a thermoplastic elastomer composition according to one embodiment of the present invention will be described.

The thermoplastic elastomer composition according to this embodiment includes a styrene block copolymer, an oil, a polyolefin resin, a polystyrene resin, and inorganic fillers and may have a post-molding shrinkage rate of about 0.08% or less, for example, about 0.05% or less, and as another example about 0.045% or less. Within this range of shrinkage rate, a molded article manufactured using the thermoplastic elastomer composition can have low dimensional change and good molding stability and can absorb shocks, which are caused by external force or generated during assembly while reducing formation of flashes.

The thermoplastic elastomer composition may be produced into a molded article using an extruder or an injection molding machine and can exhibit considerably reduced post-molding shrinkage in a machine direction (MD). In addition, a molded article manufactured using the thermoplastic elastomer composition can have a shore D hardness of about 30 to about 50 and thus can be used in applications requiring high hardness. For example, the molded article according to the present invention may be used as a frame middle mold (FMM), which is a gasket between a liquid crystal and a back chassis for a TV.

As described above, the thermoplastic elastomer composition includes the polyolefin resin and the polystyrene resin. An amount (weight) ratio of the polystyrene resin to the polyolefin resin (polystyrene resin/polyolefin resin) may range from about 0.001 to about 0.3, for example from about 0.01 to about 0.25. In some embodiments, the amount (weight) ratio of the polystyrene resin to the polyolefin resin (polystyrene resin/polyolefin resin) may range from about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, or 0.3. Within this range, the molded article can exhibit low post-molding shrinkage and high shore D hardness. The thermoplastic elastomer composition may include about 10 parts by weight to about 40 parts by weight of the styrene block copolymer, about 10 parts by weight to about 50 parts by weight of the oil, about 30 parts by weight to about 70 parts by weight of the polyolefin resin, about 1 part by weight to about 20 parts by weight of the polystyrene resin, and about 1 part by weight to about 20 parts by weight of the inorganic fillers, relative to about 100 parts by weight of the thermoplastic elastomer composition (about 100 parts by weight of the styrene block copolymer+the oil+the polyolefin resin+the polystyrene resin+the inorganic fillers). Within these ranges, the molded article can have further improved properties in terms of shock absorption and reduction in dust particles while exhibiting low post-molding shrinkage and high shore D hardness.

Next, each component of the thermoplastic elastomer composition will be described in detail.

Styrene Block Copolymer

According to the present invention, the styrene block copolymer serves to prevent deformation of a molded article manufactured using the thermoplastic elastomer composition and to provide rubbery properties. For example, the styrene block copolymer can improve hardness, heat resistance, chemical resistance, and abrasion resistance of the molded article.

The styrene block copolymer is a block copolymer including at least one styrene repeat unit. The styrene block copolymer may include a non-hydrogenated styrene repeat unit. Thus, the styrene block copolymer can reduce post-molding shrinkage of the composition along with the polystyrene resin.

The styrene block copolymer is composed of a hard segment providing deformation resistance and a soft segment providing rubbery properties, wherein the hard segment includes the styrene repeat unit. The styrene repeat unit is styrene and/or a styrene-containing monomer and may include α-methyl styrene and the like. The soft segment may include at least one repeat unit selected from among ethylene, propylene, isobutylene, and/or butylene. In exemplary embodiments, the soft segment has an amorphous structure including a random repeat unit of ethylene and butylene, thereby providing flexibility. In exemplary embodiments, the styrene block copolymer includes a copolymer of [styrene block-ethylene/butylene block-styrene block].

The styrene block copolymer may include about 10% by weight (wt %) to about 40 wt % of the hard segment and about 60 wt % to about 90 wt % of the soft segment, based on 100 wt % of the styrene block copolymer. For example, the styrene block copolymer can include about 20 wt % to about 35 wt % of the hard segment and about 65 wt % to about 80 wt % of the soft segment.

In some embodiments, the styrene block copolymer may include the hard segment in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the hard segment may be present in an amount of from about any of the foregoing amounts to about any other of the foregoing amounts.

In some embodiments, the styrene block copolymer may include the soft segment in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the soft segment may be present in an amount of from about any of the foregoing amounts to about any other of the foregoing amounts.

Since the styrene block copolymer is a major component of the thermoplastic elastomer composition along with the oil and the polyolefin resin, it can be necessary to control the weight average molecular weight of the styrene block copolymer such that the thermoplastic elastomer composition can exhibit good properties. The styrene block copolymer may have a weight average molecular weight of about 50,000 to about 300,000, for example about 100,000 to about 250,000, and as another example about 120,000 to about 200,000.

The styrene block copolymer is required to be present in a specific amount in the thermoplastic elastomer composition to provide properties typically required for the molded article without affecting post-molding shrinkage, which depends on an amount (weight) ratio of the polystyrene resin to the polyolefin resin. The styrene block copolymer may be present in an amount of about 10 parts by weight to about 40 parts by weight, for example about 15 parts by weight to about 35 parts by weight, relative to about 100 parts by weight of the thermoplastic elastomer composition (about 100 parts by weight of the styrene block copolymer+the oil+the polyolefin resin+the polystyrene resin+the inorganic fillers). Within this range, high hardness of the molded article can be secured.

In some embodiments, the thermoplastic elastomer composition may include the styrene block copolymer in an amount of about 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, or 40 parts by weight, relative to about 100 parts by weight of the thermoplastic elastomer composition. Further, according to some embodiments of the present invention, the styrene block copolymer may be present in an amount of from about any of the foregoing amounts to about any other of the foregoing amounts.

Oil

As the styrene block copolymer and the polyolefin resin have higher viscosity, the thermoplastic elastomer composition has better rubbery properties (for example, elasticity), but has lower flowability and thus lower moldability.

In the thermoplastic elastomer composition, the oil serves as a softening agent to improve flowability and moldability of the composition. The oil may be a paraffin oil. For example, the paraffin oil can include about 20 wt % to about 40 wt % of naphthene and about 60 wt % to about 80 wt % of paraffin, and as another example about 25 wt % to about 34 wt % of naphthene and about 66 wt % to about 75 wt % of paraffin, based on the total weight (100 wt %) of the paraffin oil.

In some embodiments, the paraffin oil may include naphthene in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, naphthene may be present in an amount of from about any of the foregoing amounts to about any other of the foregoing amounts.

In some embodiments, the paraffin oil may include paraffin in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, paraffin may be present in an amount of from about any of the foregoing amounts to about any other of the foregoing amounts.

When the contents (amounts) of naphthene and paraffin in the paraffin oil fall within these ranges, reduction in post-molding shrinkage of the thermoplastic elastomer composition and improvement in moldability of the composition can be achieved by controlling an amount (weight) ratio of the polystyrene resin to the polyolefin resin. The paraffin oil may have a weight average molecular weight of about 500 to about 1,000, for example about 600 to about 900. The paraffin oil may have a specific gravity of about 0.5 to about 1.0, for example about 0.85 to about 0.90, and as another example about 0.86 to about 0.88, as measured at 4° C. at 1 atm. The paraffin oil may have a flash point of about 200° C. to about 350° C., for example about 270° C. to about 300° C. The paraffin oil may have a pour point of about −20° C. to about 0° C., for example about −18° C. to about −9° C. The paraffin oil may have a kinematic viscosity of about 50 cSt to about 300 cSt, for example about 100 cSt to about 220 cSt, as measured at 40° C. When the aforementioned parameters of the paraffin oil fall within these ranges, the styrene block copolymer can be efficiently plasticized and a molded article manufactured using the composition can be prevented from blurring.

The oil is required to be present in a specific amount in the thermoplastic elastomer composition to improve flowability and moldability of the composition without affecting post-molding shrinkage, which depends on an amount ratio of the polystyrene resin to the polyolefin resin. The oil may be present in an amount of about 10 parts by weight to about 50 parts by weight, for example about 20 parts by weight to about 40 parts by weight, relative to about 100 parts by weight of the thermoplastic elastomer composition (about 100 parts by weight of the styrene block copolymer+the oil+the polyolefin resin+the polystyrene resin+the inorganic fillers). Within this range, high hardness of the molded article can be secured.

In some embodiments, the thermoplastic elastomer composition may include the oil may be present in an amount of about 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, relative to about 100 parts by weight of the thermoplastic elastomer composition. Further, according to some embodiments of the present invention, the oil may be present in an amount of from about any of the foregoing amounts to about any other of the foregoing amounts.

Polyolefin Resin

The polyolefin resin serves to reduce post-molding shrinkage of the thermoplastic elastomer composition and increase hardness of a molded article manufactured using the composition, in conjunction with the polystyrene resin. If the thermoplastic elastomer composition includes the polyolefin resin alone without the polystyrene resin, the thermoplastic elastomer composition can exhibit high post-molding shrinkage due to crystallization. In addition, the polyolefin resin serves to improve mechanical properties and injection-moldability of the thermoplastic elastomer composition while securing high hardness of the molded article.

In view of reduction in post-molding shrinkage and improvement in mechanical properties and processability, the polyolefin resin may have a melt-flow index of about 10 g/10 min to about 60 g/10 min, for example about 11 g/10 min to about 50 g/10 min, as measured at 230° C. under a load of 2.16 kg in accordance with ASTM D1238. The polyolefin resin may have a density of about 0.50 g/cm$^3$ to about 1.50 g/cm$^3$, for example about 0.89 g/cm$^3$ to about 0.98 g/cm$^3$. The polyolefin resin may have a tensile strength of about 200 kgf/cm$^2$ to about 400 kgf/cm$^2$, for example about 280 kgf/cm$^2$ to about 380 kgf/cm$^2$, as measured at a tensile rate of 50 mm/min in accordance with ASTM D638. When the aforementioned parameters of the polyolefin resin fall within these ranges, the thermoplastic elastomer composition can exhibit good properties in terms of post-molding shrinkage, mechanical properties, and processability.

The polyolefin resin may be a block copolymer-type polyolefin resin. Such a block copolymer-type polyolefin resin can help to reduce post-molding shrinkage of the thermoplastic elastomer composition including the styrene block copolymer, the oil, the polystyrene resin, and the inorganic fillers. The polyolefin resin may be a non-cyclic polyolefin resin that can help reduce the post-molding shrinkage rate, for example a block copolymer of polyethylene and polypropylene.

The polyolefin resin is present in a specific amount in the thermoplastic elastomer composition in order to secure low post-molding shrinkage of the thermoplastic elastomer composition and high hardness of the molded article while improving injection-moldability of the thermoplastic elastomer composition. The polyolefin resin may be present in an amount of about 30 parts by weight to about 70 parts by weight, for example about 35 parts by weight to about 60 parts by weight, relative to about 100 parts by weight of the thermoplastic elastomer composition (about 100 parts by weight of the styrene block copolymer+the oil+the polyolefin resin+the polystyrene resin+the inorganic fillers). Within this range, the polyolefin resin can secure high hardness of the molded article. In some embodiments, the thermoplastic elastomer composition may include the polyolefin resin in an amount of about 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, 50 parts by weight, 51 parts by weight, 52 parts by weight, 53 parts by weight, 54 parts by weight, 55 parts by weight, 56 parts by weight, 57 parts by weight, 58 parts by weight, 59 parts by weight, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, or 70 parts by weight, relative to about 100 parts by weight of the thermoplastic elastomer composition. Further, according to some embodiments of the present invention, the polyolefin resin may be present in an amount of from about any of the foregoing amounts to about any other of the foregoing amounts.

Polystyrene Resin

According to the present invention, the polystyrene resin serves to reduce post-molding shrinkage of the thermoplastic elastomer composition and to increase hardness of a molded article manufactured using the composition, in conjunction with the polyolefin resin. In addition, the polystyrene resin serves to secure moldability and molding stability of the thermoplastic elastomer composition.

In view of reduction in post-molding shrinkage and improvement in moldability and molding stability, the polystyrene resin may have a melt-flow index of about 1 g/10 min to about 20 g/10 min, for example about 5 g/10 min to about 15 g/10 min, as measured at 200° C. under a load of 5 kg in accordance with ASTM D1238. In addition, the polystyrene resin may have a density of about 0.5 g/cm$^3$ to about 1.50 g/cm$^3$, for example about 0.90 g/cm$^3$ to about 1.20 g/cm$^3$. When the aforementioned parameters of the polystyrene resin fall within these ranges, the thermoplastic elastomer composition can exhibit good properties in terms of post-molding shrinkage, mechanical properties, and processability.

The polystyrene resin may be a styrene homopolymer and/or a copolymer of styrene and a styrene derivative. The styrene derivative may include at least one of α-methyl styrene and p-t-butyl styrene. In exemplary embodiments, the polystyrene resin is a styrene homopolymer.

The polyolefin resin is present in a specific amount in the thermoplastic elastomer composition in order to secure low post-molding shrinkage of the thermoplastic elastomer composition and high hardness of the molded article while improving moldability and molding stability of the composition. The polystyrene resin may be present in an amount of about 1 part by weight to about 20 parts by weight, for example about 3 parts by weight to about 10 parts by weight, relative to about 100 parts by weight of the thermoplastic elastomer composition (about 100 parts by weight of the styrene block copolymer+the oil+the polyolefin resin+the polystyrene resin+the inorganic fillers). Within this range, the polyolefin resin can secure low post-molding shrinkage of the thermoplastic elastomer composition. In some embodiments, the thermoplastic elastomer composition may include the polystyrene resin in an amount of about 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, or 20 parts by weight, relative to about 100 parts by weight of the thermoplastic elastomer composition. Further, according to some embodiments of the present invention, the polystyrene resin may be present in an amount of from about any of the foregoing amounts to about any other of the foregoing amounts.

Inorganic Fillers

According to the present invention, the inorganic fillers serve to improve processability of the thermoplastic elastomer composition and to improve mechanical properties of a molded article manufactured using the composition. The inorganic fillers may include any typical inorganic fillers known in the art to which the present invention pertains. Examples of the inorganic fillers may include talc, clay, calcium carbonate, wollastonite, calcium sulfate, magnesium oxide, mica, and/or calcium silicate, without being limited thereto. In exemplary embodiments, the inorganic fillers are calcium carbonate. The inorganic fillers may have a spherical and/or flake shape, without being limited thereto.

In view of dispersibility of the inorganic fillers in the thermoplastic elastomer composition and extrusion workability of the composition, the inorganic fillers may have a number average particle diameter (D50) of about 30 μm or less, for example about 20 μm or less. For example, the inorganic fillers may have a number average particle diameter (D50) of about 0.1 μm to about 20 μm. In some embodiments, the inorganic filler may have a number average particle diameter (D50) of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 μm.

In view of property improvement through addition of the inorganic fillers and specific gravity and moldability of the thermoplastic elastomer composition, the inorganic fillers may be present in an amount of about 1 part by weight to about 20 parts by weight, for example about 3 parts by weight to about 9 parts by weight, relative to about 100 parts by weight of the thermoplastic elastomer composition (about 100 parts by weight of the styrene block copolymer+the oil+the polyolefin resin+the polystyrene resin+the inorganic fillers). In some embodiments, the thermoplastic elastomer composition may include the inorganic fillers in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the inorganic fillers may be present in an amount of from about any of the foregoing amounts to about any other of the foregoing amounts.

In one embodiment, the thermoplastic elastomer composition may further include any typical additive known to those skilled in the art. Examples of the additive may include a heat stabilizer, a flame retardant, an antistatic agent, an antioxidant, a lubricant, a dye, a pigment, and/or a UV absorber, without being limited thereto.

Next, a thermoplastic elastomer composition according to another embodiment of the present invention will be described.

A thermoplastic elastomer composition according to this embodiment is substantially the same as the thermoplastic elastomer composition according to the above embodiment of the present invention, except that the thermoplastic elastomer composition further includes a heat stabilizer.

The heat stabilizer serves to prevent heat and/or light-induced oxidation of a molded article manufactured using the thermoplastic elastomer composition, thereby improving reliability of the molded article. The heat stabilizer may be any typical heat stabilizer known to those skilled in the art. Examples of the heat stabilizer may include metallic heat stabilizers including an organometallic compound, such as a tin compound, hindered phenolic heat stabilizers, epoxy heat stabilizers, and/or organophosphorus heat stabilizers, without being limited thereto.

The heat stabilizer may be present in an amount of about 0.01 parts by weight to about 5 parts by weight, for example about 0.1 parts by weight to about 3 parts by weight, relative to about 100 parts by weight of the other components, that is, the styrene block copolymer, the oil, the polyolefin resin, the polystyrene resin, and the inorganic fillers. In some embodiments, the thermoplastic elastomer composition may include the heat stabilizer in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the heat stabilizer may be present in an amount of from about any of the foregoing amounts to about any other of the foregoing amounts.

Within this range, the heat stabilizer can provide discoloration resistance and decomposition resistance with minimal or no deterioration in other properties. In the thermoplastic elastomer composition according to this embodiment, each of the styrene block copolymer, the oil, the polyolefin resin, the polystyrene resin, and the inorganic fillers may be present in the same amount as in the above embodiment, relative to about 100 parts by weight of the thermoplastic elastomer composition including the styrene block copolymer, the oil, the polyolefin resin, the polystyrene resin, the inorganic fillers, and the heat stabilizer.

Molded Article Formed of Thermoplastic Elastomer Composition

In accordance with another embodiment of the present invention, a molded article is formed of the thermoplastic elastomer composition as set forth above.

The molded article may be obtained by any typical molding method such as injection molding, extruding, compression molding, and the like. The molded article may be used in various applications requiring the properties as set forth above. For example, the molded article may be used in various fields such as automobile parts, interior/exterior materials for electric/electronic products, interior materials for buildings, various daily necessities, and/or medical supplies, without being limited thereto.

Next, the present invention will be described in more detail with reference to the following examples. It should be understood that these examples are provided for illustration only and are not to be in any way construed as limiting the present invention.

Details of components used in Examples and Comparative Examples are as follows:

(A) Styrene block copolymer: A copolymer of [styrene block-ethylene/butylene block-styrene block] (Kraton® G1651, Kraton Polymers LLC)

(B) Oil: Paraffin oil (a mixture of 28 wt % of naphthene and 72 wt % of paraffin) (KL-90, Seojin Chemical Co., Ltd.)

(C) Polyolefin resin: A polypropylene-polyethylene block copolymer (CB5230, Korea Petrochemical Ind. Co., LTD.)

(D) Polystyrene resin: A polystyrene resin (GPS-5000, Formosa Petrochemical Co.)

(E) Inorganic fillers: Calcium carbonate (number average particle diameter: 4.5 μm)

(F) Heat stabilizer: A hindered phenolic heat stabilizer (Irganox 1076, BASF SE)

Examples 1 to 6 and Comparative Example 1

The aforementioned components are mixed in amounts as listed in Table 1, followed by melt extrusion at a barrel temperature of 220° C. to 270° C. using a twin-screw extruder (L/D=36, ϕ=45 mm), thereby preparing a thermoplastic elastomer composition in pellet form. The prepared pellets are dried at 80° C. for 2 hours, followed by injection molding using a 6 oz. injection molding machine (molding temperature: 300° C.), thereby preparing a specimen for property evaluation. The prepared specimen is evaluated as to the following properties and results are shown in Table 1.

(1) Shore D hardness: Shore D hardness is measured for 15 seconds and 1 second using an Asker durometer in accordance with KS M 6518 and ASTM D2240, respectively.

(2) Post-molding shrinkage: Each of the thermoplastic elastomer compositions prepared in Examples and Comparative Examples is subjected to injection molding using a mold having a size of 152.4 mm×152.4 mm×2.1 mm (MD×TD×thickness), thereby preparing a specimen. Then, the prepared specimen is allowed to stand at 25° C. for 2 hours, followed by measurement of MD length (MD1, unit: mm). In addition, the specimen is allowed to stand at 25° C. for 72 hours, followed by measurement of MD length (MD2, unit: mm), thereby calculating a post-molding shrinkage rate according to Equation 1:

Post-molding shrinkage rate (%)=(|MD2−MD1|/MD1)×100  (1)

TABLE 1

| | Item | Example 1 | Example 2 | Example 3 | Example 4 | Example 5 | Example 6 | Comp. Example 1 |
|---|---|---|---|---|---|---|---|---|
| Amount (parts by weight) | (A) | 23.7 | 23.7 | 22.0 | 21.9 | 20.5 | 20.5 | 20.5 |
| | (B) | 28.4 | 28.4 | 26.4 | 26.3 | 24.6 | 24.6 | 24.6 |
| | (C) | 37.9 | 35.5 | 39.0 | 37.3 | 42.1 | 40.0 | 49.3 |
| | (D) | 4.7 | 7.1 | 7.0 | 8.8 | 7.2 | 9.2 | — |
| | (E) | 5.2 | 5.2 | 5.5 | 5.5 | 5.5 | 5.5 | 5.5 |
| | (F) | 0.1 | 0.1 | 0.1 | 0.2 | 0.1 | 0.2 | 0.1 |
| Amount ratio* | | 0.124 | 0.200 | 0.179 | 0.236 | 0.171 | 0.230 | 0 |
| Hardness (shore D) | ASTM D2240 | 36.2 | 34.8 | 40.4 | 39.9 | 41.1 | 41.2 | 43.5 |
| | KS M 6518 | 33.4 | 31.9 | 36.6 | 36.6 | 38.5 | 38.6 | 39.8 |
| Post-molding shrinkage | MD1 (mm) | 151.17 | 151.31 | 151.30 | 151.44 | 151.39 | 151.28 | 151.12 |
| | MD2 (mm) | 151.16 | 151.29 | 151.26 | 151.41 | 151.34 | 151.22 | 150.98 |
| | Post-molding shrinkage rate (%) | 0.007 | 0.013 | 0.026 | 0.020 | 0.033 | 0.040 | 0.093 |

*Amount ratio: Weight ratio of (D) to (C) (D/C)

From the results shown in Table 1, it can be seen that the thermoplastic elastomer composition according to the present invention has low post-molding shrinkage and thus good molding stability and exhibited high shore D hardness, thereby allowing manufacture of a high-hardness molded article. Conversely, the thermoplastic elastomer composition of Comparative Example 1, which did not include the polystyrene resin (D) and has an amount (weight) ratio of the polystyrene resin (D) to the polyolefin resin (C) outside the range specified in the present invention, exhibits high post-molding shrinkage.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic elastomer composition comprising:
a styrene block copolymer, an oil, a polyolefin resin, a polystyrene resin selected from the group consisting of styrene homopolymers and/or copolymers of styrene and a styrene derivative, and inorganic fillers,
wherein the thermoplastic elastomer composition has a post-molding shrinkage rate of about 0.08% or less, as calculated by Equation 1:

Post-molding shrinkage rate (%)=(|MD2−MD1|/MD1)×100  (1)

wherein MD1 is an MD length (unit: mm) of a specimen obtained by injection molding the thermoplastic elastomer composition in a mold having a size of 152.4 mm×152.4 mm×2.1 mm (MD×TD×thickness), as measured after allowing the specimen to stand at 25° C. for 2 hours, and MD2 is an MD length (unit: mm) of the specimen, as measured after allowing the specimen to stand at 25° C. for 72 hours.

2. The thermoplastic elastomer composition according to claim 1, wherein the styrene block copolymer comprises a non-hydrogenated styrene repeat unit.

3. The thermoplastic elastomer composition according to claim 1, comprising the polystyrene resin to the polyolefin resin in a weight ratio of polystyrene resin/polyolefin resin from about 0.001 to about 0.3.

4. The thermoplastic elastomer composition according to claim 1, wherein the styrene block copolymer comprises about 10 wt % to about 40 wt % of a hard segment derived from a monomer consisting of styrene and/or a styrene-containing monomer and about 60 wt % to about 90 wt % of a segment derived from a monomer selected from the group consisting of ethylene, propylene, isobutylene, and/or butylene.

5. The thermoplastic elastomer composition according to claim 1, wherein the styrene block copolymer comprises a copolymer of [styrene block-ethylene/butylene block-styrene block].

6. The thermoplastic elastomer composition according to claim 1, wherein the oil comprises a paraffin oil comprising about 20 wt % to about 40 wt % of naphthene and about 60 wt % to about 80 wt % of paraffin.

7. The thermoplastic elastomer composition according to claim 1, wherein the polyolefin resin comprises a block copolymer of polypropylene and polyethylene.

8. The thermoplastic elastomer composition according to claim 1, wherein the inorganic fillers have a number average particle diameter of about 30 μm or less.

9. The thermoplastic elastomer composition according to claim 1, wherein the inorganic fillers are calcium carbonate.

10. The thermoplastic elastomer composition according to claim 1, comprising: about 10 parts by weight to about 40 parts by weight of the styrene block copolymer; about 10 parts by weight to about 50 parts by weight of the oil; about 30 parts by weight to about 70 parts by weight of the polyolefin resin; about 1 part by weight to about 20 parts by weight of the polystyrene resin; and about 1 part by weight to about 20 parts by weight of the inorganic fillers, each based on about 100 parts by weight of the styrene block copolymer+the oil+the polyolefin resin+the polystyrene resin+the inorganic fillers.

11. The thermoplastic elastomer composition according to claim 1, further comprising: a heat stabilizer.

12. A molded article formed of the thermoplastic elastomer composition according to claim 1.

13. The molded article according to claim 12, wherein the molded article has a shore D hardness of about 30 to about 50.

14. The thermoplastic elastomer composition according to claim 1, wherein the styrene derivative is α-methyl styrene and/or p-t-butyl styrene.

15. The thermoplastic elastomer composition according to claim 1, wherein the polystyrene resin is a styrene homopolymer.

16. The thermoplastic elastomer composition according to claim 1, wherein the polystyrene resin is a copolymer of styrene and a comonomer comprising α-methyl styrene, p-t-butyl styrene, or a combination of α-methyl styrene and p-t-butyl styrene.

* * * * *